(12) United States Patent
Cui et al.

(10) Patent No.: US 10,033,040 B2
(45) Date of Patent: Jul. 24, 2018

(54) STABLE CYCLING OF LITHIUM SULFIDE CATHODES THROUGH STRONG AFFINITY WITH MULTIFUNCTIONAL BINDERS

(71) Applicant: The Board of Trustees of the Leland Stanford Junior University, Stanford, CA (US)

(72) Inventors: Yi Cui, Stanford, CA (US); Zhi Wei Seh, Stanford, CA (US); Guangyuan Zheng, Stanford, CA (US)

(73) Assignee: The Board of Trustees of the Leland Standford Junior University, Stanford, CA (US)

( * ) Notice: Subject to any disclaimer, the term of this patent is extended or adjusted under 35 U.S.C. 154(b) by 457 days.

(21) Appl. No.: 14/325,598

(22) Filed: Jul. 8, 2014

(65) Prior Publication Data
US 2015/0010817 A1    Jan. 8, 2015

Related U.S. Application Data

(60) Provisional application No. 61/843,792, filed on Jul. 8, 2013.

(51) Int. Cl.
| | | |
|---|---|---|
| *H01M 4/62* | (2006.01) | |
| *H01M 4/04* | (2006.01) | |
| *H01M 10/052* | (2010.01) | |
| *H01M 4/1397* | (2010.01) | |

(52) U.S. Cl.
CPC ......... *H01M 4/622* (2013.01); *H01M 4/0404* (2013.01); *H01M 4/1397* (2013.01); *H01M 10/052* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 5,747,195 A * | 5/1998 | Alamgir | H01M 4/382 |
| | | | 429/235 |
| 6,350,542 B1 | 2/2002 | Gan et al. | |
| 6,919,143 B2 | 7/2005 | Hwang et al. | |
| 7,018,603 B2 | 3/2006 | Ritchie et al. | |
| 7,029,796 B2 * | 4/2006 | Choi | H01M 4/136 |
| | | | 252/182.1 |
| 7,291,424 B2 | 11/2007 | Kim et al. | |
| 7,303,837 B2 | 12/2007 | Jung et al. | |
| 2002/0039680 A1 | 4/2002 | Hwang et al. | |
| 2004/0043291 A1 | 3/2004 | Kim et al. | |

(Continued)

FOREIGN PATENT DOCUMENTS

WO    WO-2012/171889    12/2012

OTHER PUBLICATIONS

Sigma-aldrich, product specification for polymethacrylate, 2017.*
(Continued)

*Primary Examiner* — Daniel S Gatewood
(74) *Attorney, Agent, or Firm* — Foley & Lardner LLP; Cliff Z. Liu

(57) ABSTRACT

A manufacturing method of a battery electrode includes: (1) mixing $Li_2S$ particles with a binder to form a slurry, the binder including at least one of: (a) an ester moiety, (b) an amide moiety, (c) a ketone moiety, (d) an imine moiety, (e) an ether moiety, and (f) a nitrile moiety; and (2) disposing the slurry on a current collector.

6 Claims, 11 Drawing Sheets

(56) References Cited

U.S. PATENT DOCUMENTS

| | | | | |
|---|---|---|---|---|
| 2004/0091776 | A1* | 5/2004 | Hwang | H01M 2/1673 429/218.1 |
| 2009/0081553 | A1* | 3/2009 | Kondo | H01M 2/021 429/314 |
| 2009/0239148 | A1* | 9/2009 | Jiang | H01M 4/131 429/221 |
| 2010/0129724 | A1 | 5/2010 | Kolosnitsyn | |
| 2011/0163274 | A1* | 7/2011 | Plee | H01M 4/134 252/503 |
| 2011/0165466 | A1 | 7/2011 | Zhamu et al. | |
| 2011/0200883 | A1 | 8/2011 | Cui et al. | |
| 2012/0094189 | A1 | 4/2012 | Scrosati et al. | |

OTHER PUBLICATIONS

International Preliminary Report on Patentability (IPRP) for International Application No. PCT/US2014/045674, dated Jan. 21, 2016.
Bruce et al., "Li-O2 and Li-S Batteries with High Energy Storage", Nature Materials, 2012, 22(1), pp. 19-29.
Cheon, S.E. et al., Structural Factors of Sulfur Cathodes with Poly(ethylene oxide) Binder for Performance of Rechargeable Lithium Sulfur Batteries, J. Electrochem. Soc. 2002 149(11): A1437-A1441.
Cui et al., "Amphiphilic Surface Modification of Hollow Carbon Nanofibers for Improved Cycle Life of Lithium Sulfur Batteries," Nano Lett., (2013), 13(3), pp. 1265-1270.
Ji et al., "Graphene Oxide as a Sulfur Immobilizer in High Performance Lithium/Sulfur Cells," J. Amer. Chem. Soc. 133(46), (2011) pp. 18522-18525.
Ji X., et al., "Stabilizing lithium-sulphur cathodes using polysulphide reservoirs," Nat. Commun. 2:325 (2011) pp. 1-7.
Ji, et al., "A highly ordered nanostructured carbon-sulphur cathode for lithium-sulphur batteries", Nature Materials, vol. 8, Jun. 2009, 500-506.
Rao et al., "Carbon nanofiber-sulfer composite cathode materials with different binders for secondary Li/S cells," Electrochimica Acta, 65 (2012) pp. 228-233.
Seh Z. W., et al., "Sulphur-TiO2 yolk-shell nanoarchitecture with internal void space for long-cycle lithium-sulphur batteries," Nat. Commun. 4:1331 (2013).
Su Y.S., et al., "Lithium-sulphur batteries with a microporous carbon paper as a bifunctional interlayer," Nat. Commun. 3:1166 (2012).
Sun et al., "Application of gelatin as a binder for the sulfur cathode in lithium-sulfur batteries," Electrochimica Acta, 53:24,(2008) pp. 7084-7088.
Xiao, et al., "A Soft Approach to Encapsulate Sulfur: Polyaniline Nanotubes for Lithium-Sulfur Batteries with Long Cycle Life", Advanced Materials, 2012, 24, 1176-1181.
Yang, Yuan et al., "Nanostructured Sulfur Cathodes," Chemical Society Reviews, Epub: Jan. 17, 2013, vol. 42, 7, pp. 3018-3032.
Sigma-Aldrich, Product Specification: "Ethyl methacrylate, analytical standard," retrieved from www.sigmaaldrich.com on Sep. 17, 2017.
Sigma-Aldrich, Product Specification: "Methyl acrylate," retrieved from www.sigmaaldrich.com on Sep. 17, 2017.
Sigma-Aldrich, Product Specification: "Methyl methacrylate—99%, contains ≤30 ppm monomethyl ether hydroquinone as inhibitor," 1 page, downloaded 2017.

* cited by examiner

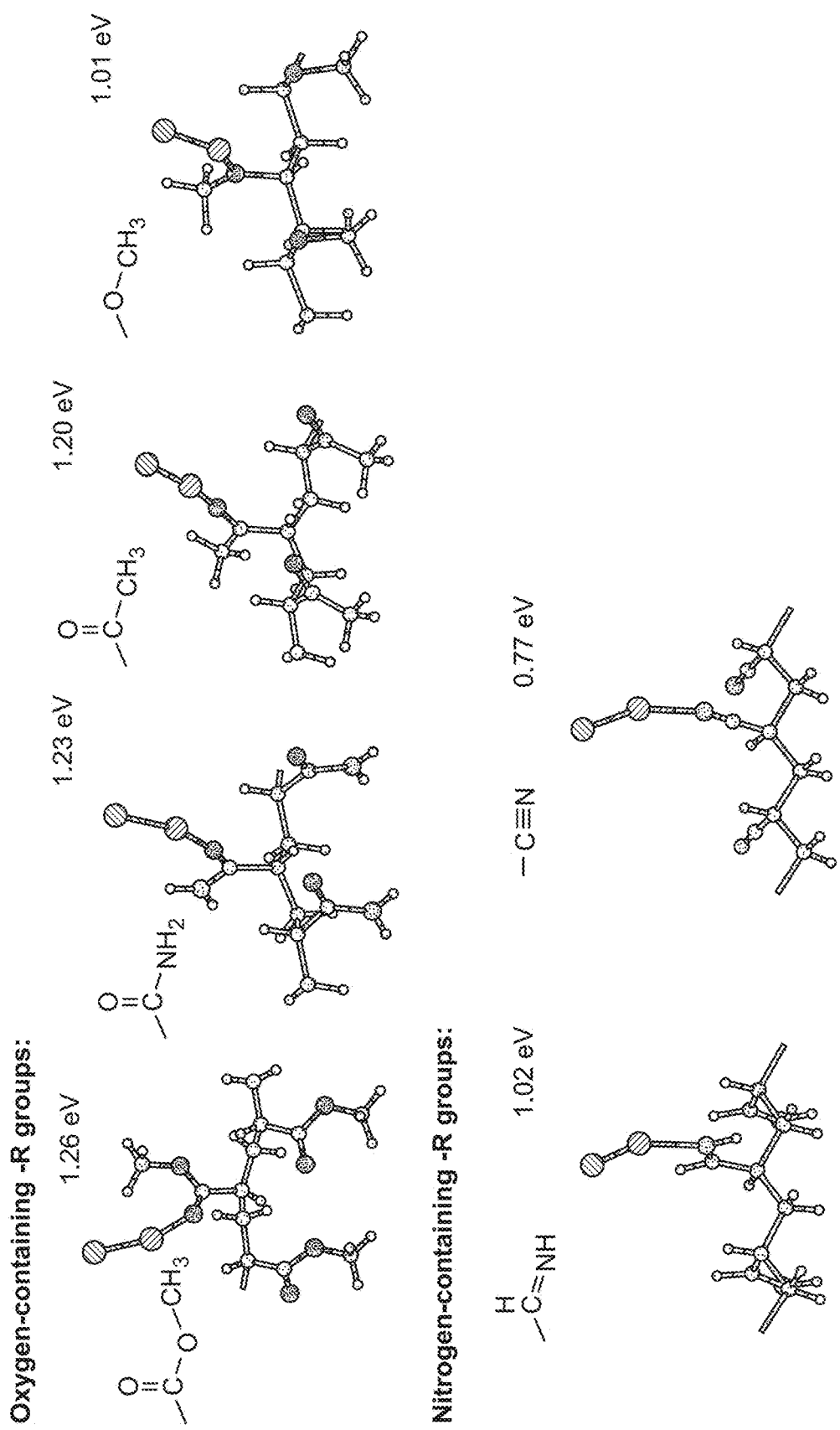

STABLE CYCLING OF LITHIUM SULFIDE CATHODES THROUGH STRONG AFFINITY WITH MULTIFUNCTIONAL BINDERS

CROSS REFERENCE TO RELATED APPLICATION

This application claims the benefit of U.S. Provisional Application Ser. No. 61/843,792, filed on Jul. 8, 2013, the content of which is incorporated herein by reference in its entirety.

STATEMENT REGARDING FEDERALLY SPONSORED RESEARCH OR DEVELOPMENT

This invention was made with Government support under contract DE-ACO2-765F00515 awarded by the Department of Energy. The Government has certain rights in this invention.

TECHNICAL FIELD

This disclosure generally relates to batteries and, more particularly, multifunctional binders for lithium sulfide cathodes.

BACKGROUND

Over the past two decades, energy storage technologies based on lithium-ion batteries have proven successful and found widespread use in many applications such as portable electronics and consumer devices. However, intercalation cathodes used in current lithium-ion batteries possess an inherent theoretical capacity limit of about 300 mAh g$^{-1}$, which is a major factor limiting the specific energy of such batteries. These inherent theoretical constraints hinder the widespread use of lithium-ion batteries in many emerging applications such as vehicle electrification, thus impelling the pursuit of next-generation cathode materials with much higher specific capacities. Sulfur is a promising cathode material with a high theoretical capacity of about 1,673 mAh g$^{-1}$ based on the electrochemical reaction: $S_8+16Li \leftrightarrows 8Li_2S$. There has been exciting progress in understanding and improving the electrochemical performance of sulfur cathodes. However, further progress is hindered by pairing with a lithium metal anode, which is prone to dendrite formation and other safety-related challenges.

Compared to sulfur, substantially fully-lithiated lithium sulfide ($Li_2S$) (theoretical capacity of about 1,166 mAh g$^{-1}$) represents a more attractive cathode material because it allows pairing with high-capacity lithium metal-free anodes (such as silicon or tin), hence obviating dendrite formation and safety concerns associated with metallic lithium. Moreover, the high melting point of $Li_2S$ (unlike that of sulfur) imparts greater ease of processing in the synthesis of carbon-based composite cathode materials. Furthermore, sulfur expands during lithiation, which can cause a surrounding material to crack and fracture. In contrast, $Li_2S$ contracts during delithiation, thereby mitigating against challenges resulting from volume expansion. Despite the promise, current efforts remain lacking in terms of achieving stable and high-performance $Li_2S$ cathodes. For example, the overall cycling performance and stability of $Li_2S$ cathodes remain generally poor, with typical cycle life of less than 100 cycles demonstrated in some reports.

It is against this background that a need arose to develop the multifunctional binders described herein.

SUMMARY

Rechargeable lithium-sulfur batteries have attracted great interest in recent years because of their high theoretical specific energy, which is several times that of current lithium-ion batteries. Compared to sulfur, substantially fully-lithiated $Li_2S$ represents a more attractive cathode material because it allows pairing with safer, lithium metal-free anodes. In some embodiments of this disclosure, stable and high-performance $Li_2S$ cathodes are demonstrated by using ab initio simulations to guide a rational selection of a binder which exhibits strong affinity with both $Li_2S$ and lithium polysulfides. In one embodiment using polyvinylpyrrolidone as the binder, a high discharge capacity of about 760 mAh g$^{-1}$ of $Li_2S$ (about 1,090 mAh g$^{-1}$ of S) was achieved at about 0.2 C with stable cycling over prolonged 500 charge/discharge cycles.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Definitions

Figure 1:
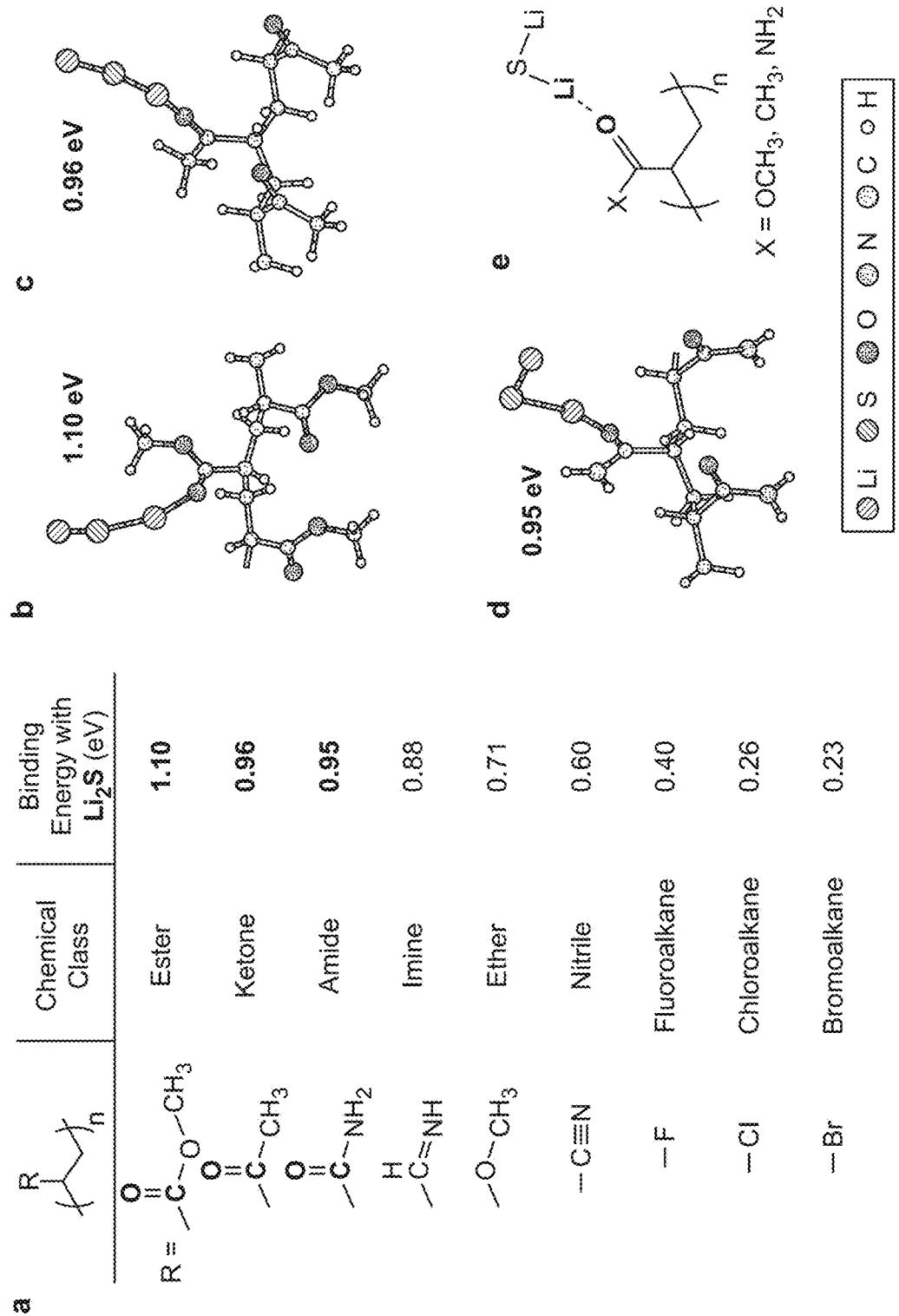
FIG. 1: (a) Table showing the calculated binding energies of $Li_2S$ with various functional groups (R) based on the framework of vinyl polymers —$(CH_2$—$CHR)_n$—. (b-d) Ab initio simulations showing the most stable configurations and calculated binding energies of $Li_2S$ with (b) ester, (c) ketone, and (d) amide R groups in vinyl polymers. (e) General schematic representing the Li—O interaction between $Li_2S$ and >C=O groups as shown in (b-d).

The following definitions apply to some of the aspects described with regard to some embodiments of this disclosure. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set can also be referred to as members of the set. Objects of a set can be the same or different. In some instances, objects of a set can share one or more common characteristics.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the terms "optional" and "optionally" mean that the subsequently described event or circumstance may or may not occur and that the description includes instances where the event or circumstance occurs and instances in which it does not.

As used herein, the term "alkane" refers to a saturated hydrocarbon molecule. For certain implementations, an alkane can include from 1 to 100 carbon atoms. The term "lower alkane" refers to an alkane that includes from 1 to 20 carbon atoms, such as from 1 to 10, from 2 to 10, from 3 to 10, from 4 to 10, or from 5 to 10 carbon atoms, while the term "upper alkane" refers to an alkane that includes more than 20 carbon atoms, such as from 21 to 100 carbon atoms. The term "branched alkane" refers to an alkane that includes a set of branches, while the term "unbranched alkane" refers to an alkane that is straight-chained. The term "cycloalkane" refers to an alkane that includes a set of ring structures, such as a single ring structure or a bicyclo or higher order cyclic structure. The term "heteroalkane" refers to an alkane that has a set of its carbon atoms replaced by a set of heteroatoms, such as N, Si, S, O, and P. The term "substituted alkane" refers to an alkane that has a set of its hydrogen atoms replaced by a set of substituent groups, while the term "unsubstituted alkane" refers to an alkane that lacks such replacement. Combinations of the above terms can be used to refer to an alkane having a combination of characteristics. For example, the term "branched lower alkane" can be used to refer to an alkane that includes from 1 to 20 carbon atoms and a set of branches.

As used herein, the term "alkyl" refers to a monovalent form of an alkane. For example, an alkyl can be envisioned as an alkane with one of its hydrogen atoms removed to allow bonding to another group of a molecule. The term "lower alkyl" refers to a monovalent form of a lower alkane, while the term "upper alkyl" refers to a monovalent form of an upper alkane. The term "branched alkyl" refers to a monovalent form of a branched alkane, while the term "unbranched alkyl" refers to a monovalent form of an unbranched alkane. The term "cycloalkyl" refers to a monovalent form of a cycloalkane, and the term "heteroalkyl" refers to a monovalent form of a heteroalkane. The term "substituted alkyl" refers to a monovalent form of a substituted alkane, while the term "unsubstituted alkyl" refers to a monovalent form of an unsubstituted alkane. Examples of alkyls include methyl, ethyl, n-propyl, isopropyl, cyclopropyl, n-butyl, s-butyl, isobutyl, t-butyl, cyclobutyl, n-pentyl, 1-adamantyl, 2-pinenyl, and charged, hetero, or substituted forms thereof.

As used herein, the term "alkylene" refers to a bivalent form of an alkane. For example, an alkylene can be envisioned as an alkane with two of its hydrogen atoms removed to allow bonding to one or more additional groups of a molecule. The term "lower alkylene" refers to a bivalent form of a lower alkane, while the term "upper alkylene" refers to a bivalent form of an upper alkane. The term "branched alkylene" refers to a bivalent form of a branched alkane, while the term "unbranched alkylene" refers to a bivalent form of an unbranched alkane. The term "cycloalkylene" refers to a bivalent form of a cycloalkane, and the term "heteroalkylene" refers to a bivalent form of a heteroalkane. The term "substituted alkylene" refers to a bivalent form of a substituted alkane, while the term "unsubstituted alkylene" refers to a bivalent form of an unsubstituted alkane. Examples of alkylenes include methylene, ethylene, propylene, 2-methylpropylene, and charged, hetero, or substituted forms thereof.

As used herein, the term "alkene" refers to an unsaturated hydrocarbon molecule that includes a set of carbon-carbon double bonds. For certain implementations, an alkene can include from 2 to 100 carbon atoms. The term "lower alkene" refers to an alkene that includes from 2 to 20 carbon atoms, such as from 2 to 10, from 3 to 10, from 4 to 10, or from 5 to 10 carbon atoms, while the term "upper alkene" refers to an alkene that includes more than 20 carbon atoms, such as from 21 to 100 carbon atoms. The term "cycloalkene" refers to an alkene that includes a set of ring structures, such as a single ring structure or a bicyclo or higher order cyclic structure. The term "heteroalkene" refers to an alkene that has a set of its carbon atoms replaced by a set of heteroatoms, such as N, Si, S, O, and P. The term "substituted alkene" refers to an alkene that has a set of its hydrogen atoms replaced by a set of substituent groups, while the term "unsubstituted alkene" refers to an alkene that lacks such replacement. Combinations of the above terms can be used to refer to an alkene having a combination of characteristics. For example, the term "substituted lower alkene" can be used to refer to an alkene that includes from 1 to 20 carbon atoms and a set of substituent groups.

As used herein, the term "alkenyl" refers to a monovalent form of an alkene. For example, an alkenyl can be envisioned as an alkene with one of its hydrogen atoms removed to allow bonding to another group of a molecule. The term "lower alkenyl" refers to a monovalent form of a lower alkene, while the term "upper alkenyl" refers to a monovalent form of an upper alkene. The term "cycloalkenyl" refers to a monovalent form of a cycloalkene, and the term "heteroalkenyl" refers to a monovalent form of a heteroalkene. The term "substituted alkenyl" refers to a monovalent form of a substituted alkene, while the term "unsubstituted alkenyl" refers to a monovalent form of an unsubstituted alkene. Examples of alkenyls include ethenyl, 2-propenyl (i.e., allyl), isopropenyl, cyclopropenyl, butenyl, isobutenyl, t-butenyl, cyclobutenyl, and charged, hetero, or substituted forms thereof.

As used herein, the term "alkenylene" refers to a bivalent form of an alkene. For example, an alkenylene can be envisioned as an alkene with two of its hydrogen atoms removed to allow bonding to one or more additional groups of a molecule. The term "lower alkenylene" refers to a bivalent form of a lower alkene, while the term "upper alkenylene" refers to a bivalent form of an upper alkene. The term "cycloalkenylene" refers to a bivalent form of a cycloalkene, and the term "heteroalkenylene" refers to a bivalent form of a heteroalkene. The term "substituted alkenylene" refers to a bivalent form of a substituted alkene, while the term "unsubstituted alkenylene" refers to a bivalent form of an unsubstituted alkene. Examples of alkenyls include ethenylene, propenylene, 2-methylpropenylene, and charged, hetero, or substituted forms thereof.

As used herein, the term "alkyne" refers to an unsaturated hydrocarbon molecule that includes a set of carbon-carbon triple bonds. In some instances, an alkyne can also include a set of carbon-carbon double bonds. For certain implementations, an alkyne can include from 2 to 100 carbon atoms. The term "lower alkyne" refers to an alkyne that includes from 2 to 20 carbon atoms, such as from 2 to 10, from 3 to 10, from 4 to 10, or from 5 to 10 carbon atoms, while the term "upper alkyne" refers to an alkyne that includes more than 20 carbon atoms, such as from 21 to 100 carbon atoms. The term "cycloalkyne" refers to an alkyne that includes a set of ring structures, such as a single ring structure or a bicyclo or higher order cyclic structure. The term "heteroalkyne" refers to an alkyne that has a set of its carbon atoms replaced by a set of heteroatoms, such as N, Si, S, O, and P. The term "substituted alkyne" refers to an alkyne that has a set of its hydrogen atoms replaced by a set of substituent groups, while the term "unsubstituted alkyne" refers to an alkyne that lacks such replacement. Combinations of the above terms can be used to refer to an alkyne having a combination of characteristics. For example, the term "substituted lower alkyne" can be used to refer to an alkyne that includes from 1 to 20 carbon atoms and a set of substituent groups.

As used herein, the term "alkynyl" refers to a monovalent form of an alkyne. For example, an alkynyl can be envisioned as an alkyne with one of its hydrogen atoms removed to allow bonding to another group of a molecule. The term "lower alkynyl" refers to a monovalent form of a lower alkyne, while the term "upper alkynyl" refers to a monovalent form of an upper alkyne. The term "cycloalkynyl" refers to a monovalent form of a cycloalkyne, and the term "heteroalkynyl" refers to a monovalent form of a heteroalkyne. The term "substituted alkynyl" refers to a monovalent form of a substituted alkyne, while the term "unsubstituted alkynyl" refers to a monovalent form of an unsubstituted alkyne. Examples of alkynyls include ethynyl, propynyl, isopropynyl, butynyl, isobutynyl, t-butynyl, and charged, hetero, or substituted forms thereof.

As used herein, the term "alkynylene" refers to a bivalent form of an alkyne. For example, an alkynylene can be envisioned as an alkyne with two of its hydrogen atoms removed to allow bonding to one or more additional groups of a molecule. The term "lower alkynylene" refers to a bivalent form of a lower alkyne, while the term "upper alkynylene" refers to a bivalent form of an upper alkyne. The term "cycloalkynylene" refers to a bivalent form of a cycloalkyne, and the term "heteroalkynylene" refers to a bivalent form of a heteroalkyne. The term "substituted alkynylene" refers to a bivalent form of a substituted alkyne, while the term "unsubstituted alkynylene" refers to a bivalent form of an unsubstituted alkyne. Examples of alkynylenes include ethynylene, propynylene, 1-butynylene, 1-buten-3-ynylene, and charged, hetero, or substituted forms thereof.

As used herein, the term "arene" refers to an aromatic hydrocarbon molecule. For certain implementations, an arene can include from 5 to 100 carbon atoms. The term "lower arene" refers to an arene that includes from 5 to 20 carbon atoms, such as from 5 to 14 carbon atoms, while the term "upper arene" refers to an arene that includes more than 20 carbon atoms, such as from 21 to 100 carbon atoms. The term "monocyclic arene" refers to an arene that includes a single aromatic ring structure, while the term "polycyclic arene" refers to an arene that includes more than one aromatic ring structure, such as two or more aromatic ring structures that are bonded via a carbon-carbon bond or that are fused together. The term "heteroarene" refers to an arene that has a set of its carbon atoms replaced by a set of heteroatoms, such as N, Si, S, O, and P. The term "substituted arene" refers to an arene that has a set of its hydrogen atoms replaced by a set of substituent groups, while the term "unsubstituted arene" refers to an arene that lacks such replacement. Combinations of the above terms can be used to refer to an arene having a combination of characteristics. For example, the term "monocyclic lower alkene" can be used to refer to an arene that includes from 5 to 20 carbon atoms and a single aromatic ring structure.

As used herein, the term "aryl" refers to a monovalent form of an arene. For example, an aryl can be envisioned as an arene with one of its hydrogen atoms removed to allow bonding to another group of a molecule. The term "lower aryl" refers to a monovalent form of a lower arene, while the term "upper aryl" refers to a monovalent form of an upper arene. The term "monocyclic aryl" refers to a monovalent form of a monocyclic arene, while the term "polycyclic aryl" refers to a monovalent form of a polycyclic arene. The term "heteroaryl" refers to a monovalent form of a heteroarene. The term "substituted aryl" refers to a monovalent form of a substituted arene, while the term "unsubstituted aryl" refers to a monovalent form of an unsubstituted arene. Examples of aryls include phenyl, biphenylyl, naphthyl, pyridinyl, pyridazinyl, pyrimidinyl, pyrazinyl, quinolyl, isoquinolyl, and charged, hetero, or substituted forms thereof.

As used herein, the term "arylene" refers to a bivalent form of an arene. For example, an arylene can be envisioned as an arene with two of its hydrogen atoms removed to allow bonding to one or more additional groups of a molecule. The term "lower arylene" refers to a bivalent form of a lower arene, while the term "upper arylene" refers to a bivalent form of an upper arene. The term "monocyclic arylene" refers to a bivalent form of a monocyclic arene, while the term "polycyclic arylene" refers to a bivalent form of a polycyclic arene. The term "heteroarylene" refers to a bivalent form of a heteroarene. The term "substituted arylene" refers to a bivalent form of a substituted arene, while the term "unsubstituted arylene" refers to a bivalent form of an unsubstituted arene.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of 1 to 20 should be understood to include the explicitly recited limits of 1 and 20, but also to include individual values such as 2, 3, and 4, and sub-ranges such as 1 to 5, 2 to 10, 1 to 3, 2 to 3, and so forth.

Overview

The use of effective binders can have a profound effect on the structural stability, kinetics, and long-term cycling performance of electrode materials. In the case of sulfur cathodes, the effect of different binders on their electrochemical performance can be understood, with the most commonly-used binder being polyvinylidene fluoride (PVDF). Developing an effective binder for $Li_2S$ cathodes (as opposed to sulfur) involves a paradigm shift because $Li_2S$ is ionic and highly polar, whereas sulfur is covalent and non-polar in nature. Because of this difference in bonding and chemical nature, binder materials that interact strongly with sulfur particles to act as good dispersion agents may not be effective for $Li_2S$ and vice-versa. Besides strong interaction with $Li_2S$, it would be an added benefit if the proposed binder has a strong affinity for lithium polysulfides ($Li_2S_n$, $4 \leq n \leq 8$) as well. This affinity can reduce or minimize loss of polysulfides into an electrolyte during cycling, which is a major contributor of rapid capacity decay in $Li_2S$ cathodes. Hence, advancing the performance of these cathodes involves a more thorough understanding of $Li_2S$-binder and $Li_2S_n$-binder interactions, both of which are relatively unexplored to date.

Embodiments of this disclosure provide a framework for a rational design of stable and high-performance $Li_2S$ cathodes by first using ab initio simulations to elucidate the interaction between $Li_2S$ and lithium polysulfides with various functional groups found in macromolecular binders. In light of this understanding, polyvinylpyrrolidone (PVP) is selected as an example binder for evaluation in $Li_2S$ cathodes. This multifunctional binder is found to exhibit strong affinity with: a) $Li_2S$ to form a uniform dispersion of active material and carbon in an electrode slurry, and b) lithium polysulfides to reduce or minimize their loss into an electrolyte during cycling. Using PVP as a binder in one embodiment, an initial specific capacity of about 760 mAh $g^{-1}$ of $Li_2S$ (about 1,090 mAh $g^{-1}$ of S) is achieved at about 0.2 C, with unprecedented capacity retention of about 94% in the first 100 cycles. Even after prolonged cycling over 500 charge/discharge cycles, cells retain about 69% of their initial capacity, which corresponds to a small capacity decay of about 0.062% per cycle.

Although some embodiments of this disclosure are explained in the context of $Li_2S$ cathodes, other embodiments are generally applicable to sulfur-containing cathodes and sulfur-containing active cathode materials, which can include one or more of elemental sulfur (S), a metal sulfide, a metal polysulfide, or a mixture thereof. For example, a sulfur-containing cathode material can include one or more of elemental sulfur, $Li_2S$, $Li_2S_2$, $Li_2S_3$, $Li_2S_x$ with $4 \leq x \leq 8$, or a mixture thereof.

Ab Initio Simulations and Evaluation of Example Binders

Figure 2:
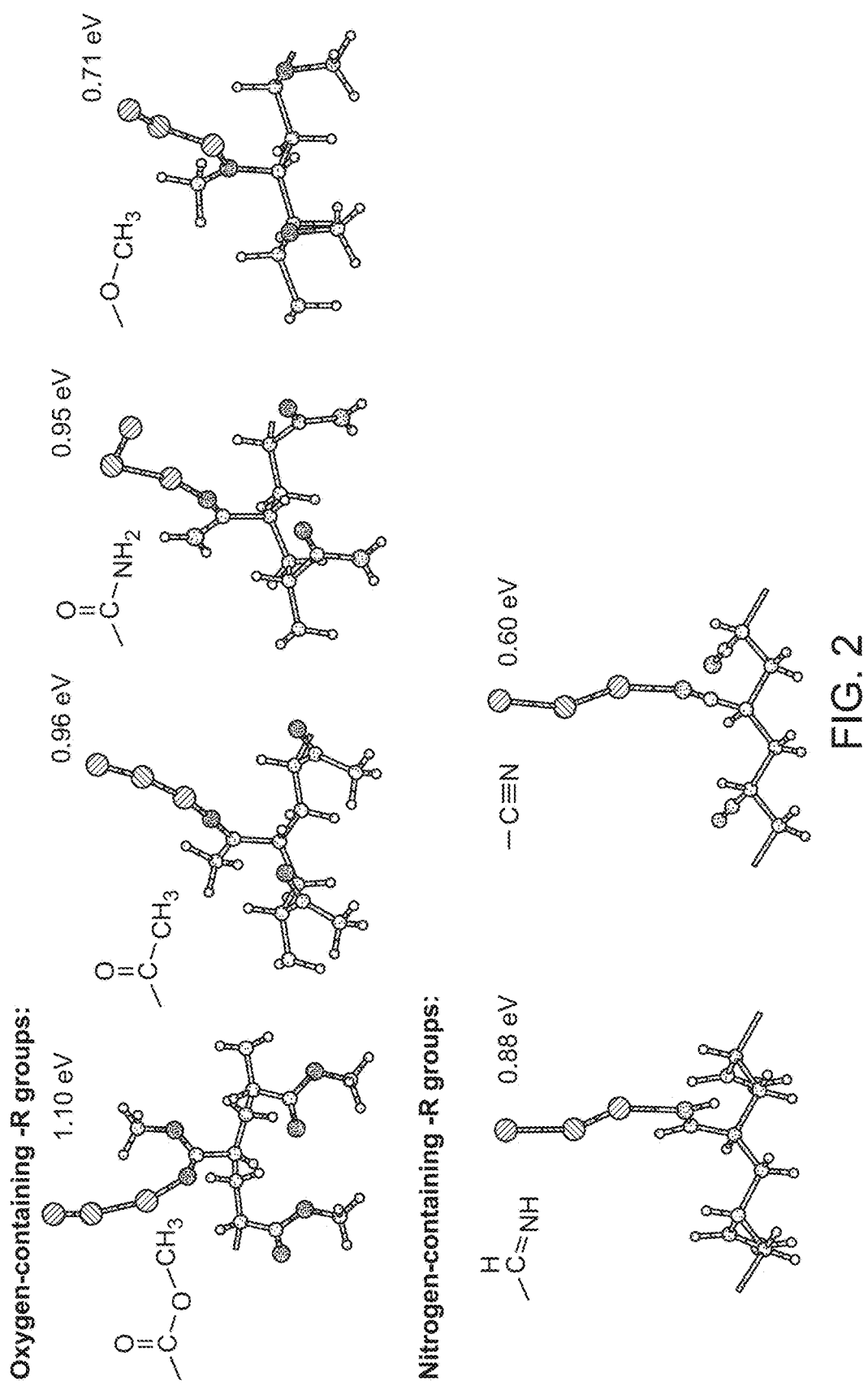
FIG. 2: Ab initio simulations showing the most stable configurations and calculated binding energies of $Li_2S$ with various functional groups (R) based on the framework of vinyl polymers —$(CH_2$—$CHR)_n$—.
Figure 2:
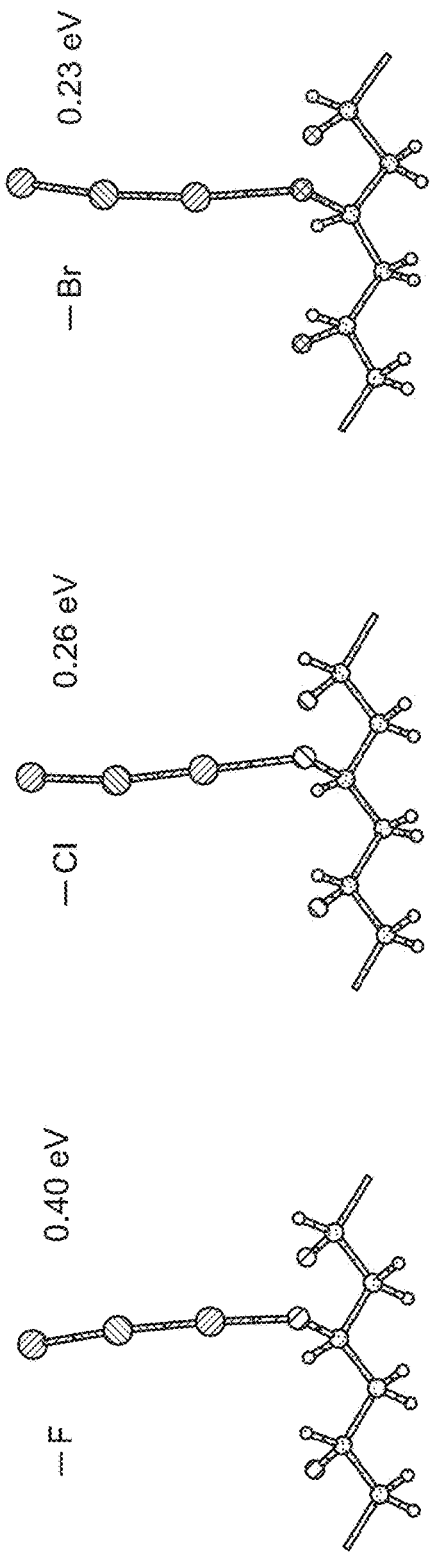
Figure 2:
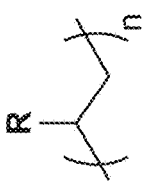
Figure 2:
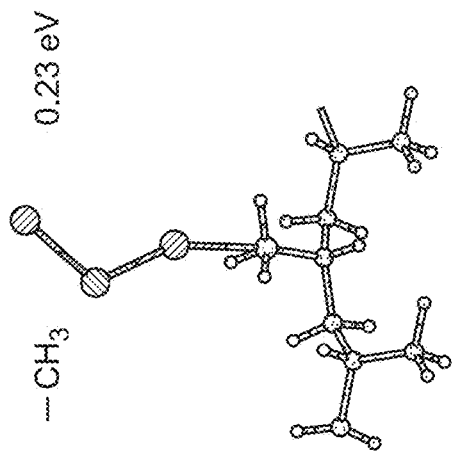
Figure 3:
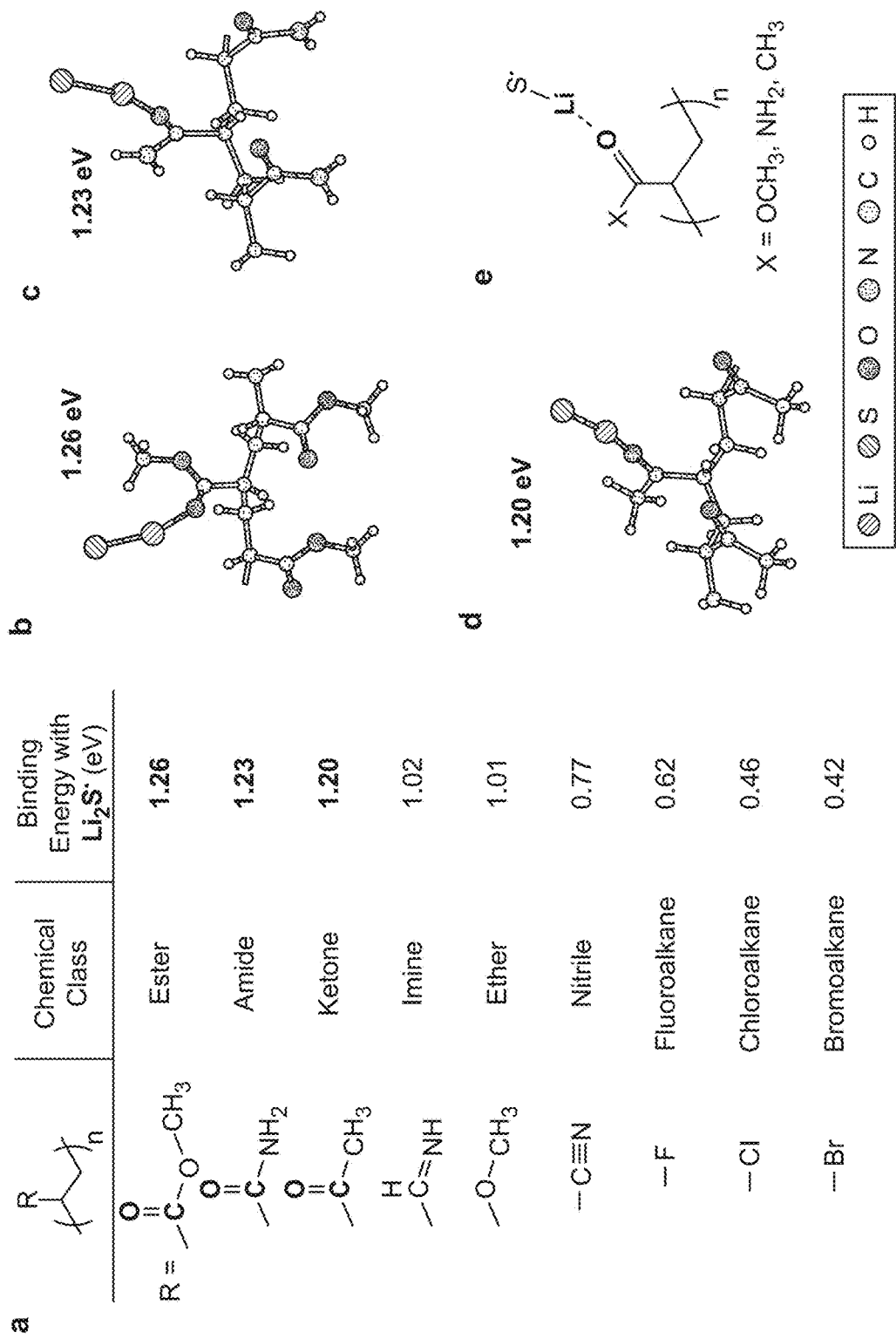
FIG. 3: (a) Table showing the calculated binding energies of Li—S species with various functional groups (R) based on the framework of vinyl polymers —$(CH_2$—$CHR)_n$—. (b-d) Ab initio simulations showing the most stable configurations and calculated binding energies of Li—S. with (b) ester, (c) amide, and (d) ketone R groups in vinyl polymers. (e) General schematic representing the Li—O interaction between Li—S. and >C=O groups as shown in (b-d).

To gain an understanding of $Li_2S$-binder interactions, ab initio simulations are performed in the framework of density functional theory. To do so, a general structural framework based on vinyl polymers —$(CH_2—CHR)_n$— is used to represent the various functional groups (R) found in macromolecular binders, and the binding energies of these various groups with $Li_2S$ were evaluated. Functional groups, including those that contain oxygen, nitrogen, and halogen atoms, were included in these simulations. Strongly acidic and basic groups, such as carboxyl, hydroxyl, and amine groups, were excluded due to their potential for undesired reaction with $Li_2S$ and sulfur respectively. The results are summarized in FIG. 1 (see also FIG. 2 for additional details). It can be observed that, in general, electron-rich groups with lone pairs on oxygen, nitrogen, and halogen atoms are capable of binding with lithium in $Li_2S$ through a coordination-like interaction (see FIG. 2). More importantly, the strongest interaction with $Li_2S$ is observed in the case of binding with carbonyl (>C=O) groups such as those found in esters, ketones, and amides, with binding energies of about 1.10, about 0.96, and about 0.95 eV respectively (see FIG. 1a). In all of these cases, the most stable configuration corresponds to lithium binding directly to the doubly-bonded oxygen atom in the >C=O group, forming a strong lithium-oxygen (Li—O) interaction (see FIG. 1b-e). This can be rationalized by considering the hard acid nature of Li+, which renders strong interaction with the hard oxygen donor atoms in >C=O groups. In comparison, halogenated groups, which form the basis of binders such as PVDF, possess much weaker interaction with $Li_2S$, with typical binding energies in the range of about 0.23 to about 0.40 eV (see FIG. 1a). It can be observed that the binding energy of $Li_2S$ with halogenated groups follows the order: —F>—Cl>—Br (see FIG. 1a), which is in good agreement with the relative hardness of the donor atoms (F>Cl>Br).

Figure 4:
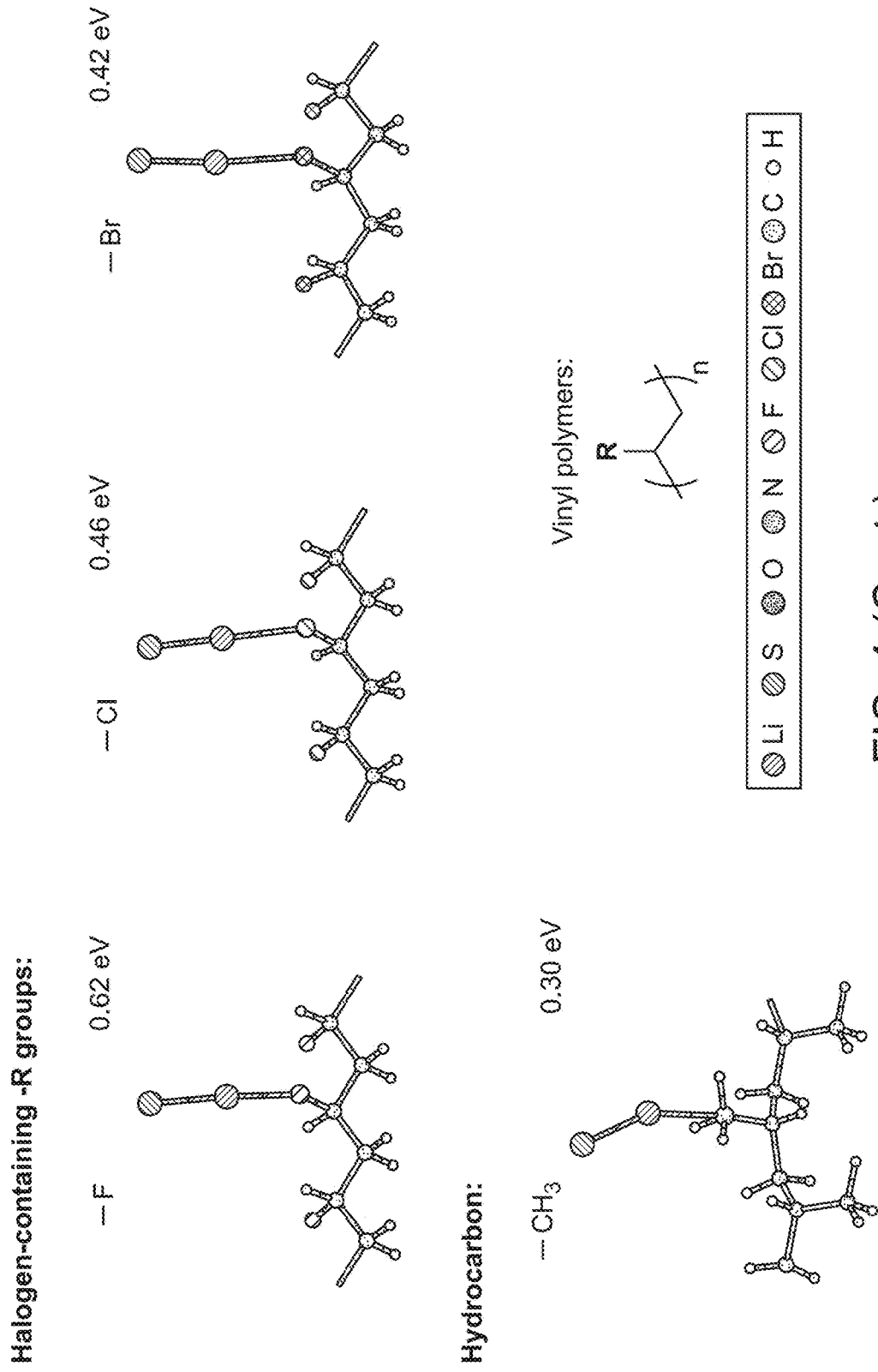
FIG. 4: Ab initio simulations showing the most stable configurations and calculated binding energies of Li—S. species with various functional groups (R) based on the framework of vinyl polymers —$(CH_2$—$CHR)_n$—.

Additional ab initio simulations are performed to elucidate the interaction of various functional groups with Li—S. species, which can be used to represent the relevant end groups in the general class of lithium polysulfides (Li—S—$S_{n-2}$—S—Li; $Li_2S_n$ in short, $4 \leq n \leq 8$). The results are summarized in FIG. 3 (see FIG. 4 for additional details). It can be observed that Li—S. species exhibit the strongest binding with >C=O groups as well, with typical binding energies in the range of about 1.20 to about 1.26 eV (see FIG. 3a). This is contrasted with the much lower binding energy of Li—S. with halogenated groups, such as about 0.62 eV in the case of binding with —F groups (see FIG. 3a). For the interaction of Li—S. with >C=O groups, the most stable configuration corresponds to lithium binding directly to the doubly-bonded oxygen atom, forming a strong Li—O interaction as shown in FIG. 3b-e.

Figure 5:
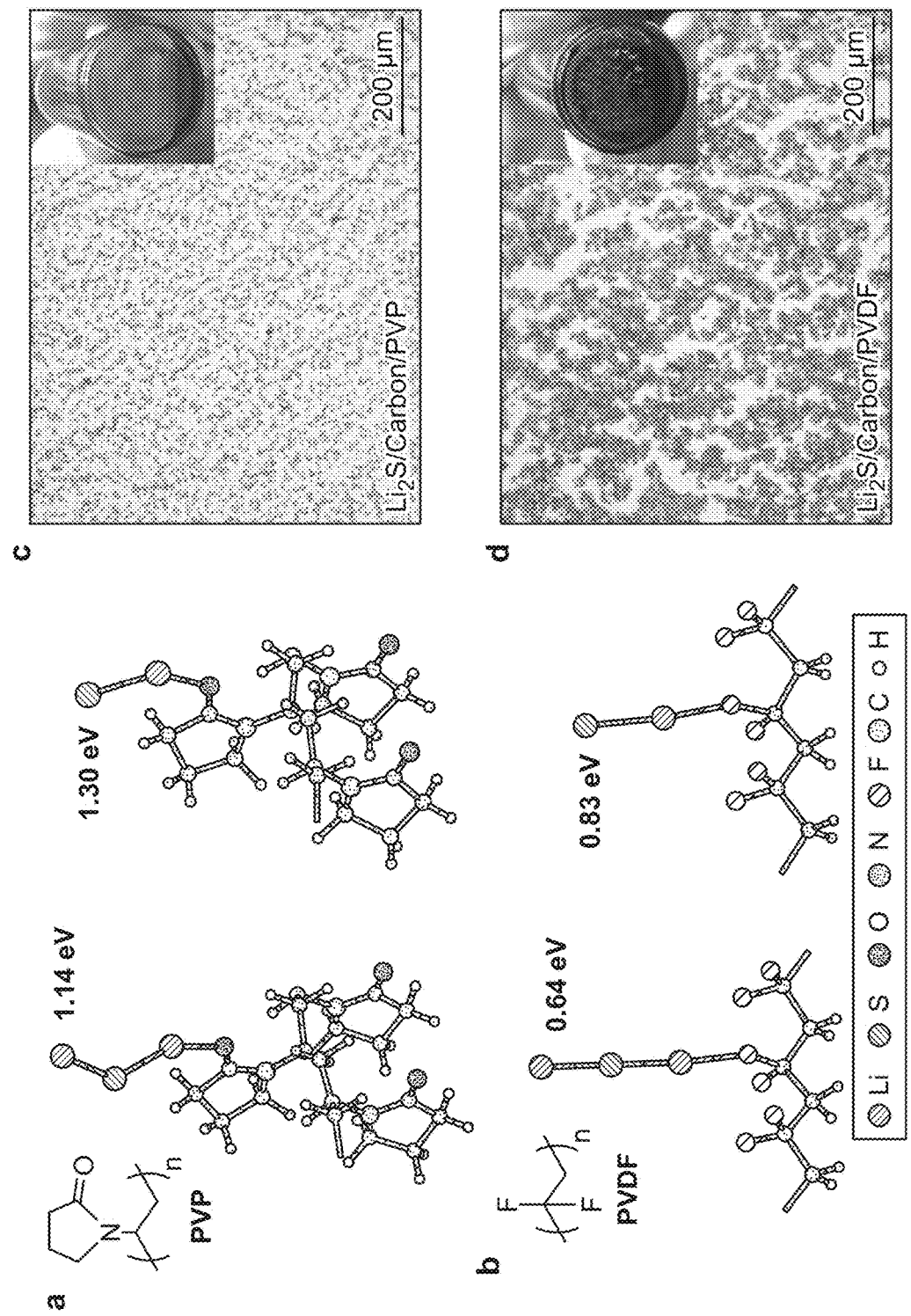
FIG. 5: (a, b) Ab initio simulations showing the most stable configurations and calculated binding energies of $Li_2S$ and Li—S. species with (a) polyvinylpyrrolidone (PVP) and (b) polyvinylidene fluoride (PVDF) binders. (c, d) Optical microscopy and digital camera images (inset) showing the electrode slurry of (c) $Li_2S$/carbon black/PVP binder and (d) $Li_2S$/carbon black/PVDF binder in N-methyl-2-pyrrolidinone (about 60:35:5 by weight in both cases).

In light of this understanding of Li$_2$S-binder and Li—S.-binder interactions, PVP, which is a polymer rich in >C═O groups, is selected as an example binder in Li$_2$S cathodes. Ab initio simulation results show that the >C═O groups in PVP exhibit high binding energies of about 1.14 and about 1.30 eV with Li$_2$S and Li—S. species respectively (Li—O interaction; see FIG. 5a). In comparison, PVDF binder (rich in —F groups) is found to possess weaker interaction with Li$_2$S and Li—S. species, with lower binding energies of about 0.64 and about 0.83 eV respectively (see FIG. 5b). To compare the effectiveness of PVP and PVDF binders as dispersion agents for Li$_2$S cathodes, electrode slurries were prepared by mixing ball-milled Li$_2$S particles with conductive carbon black and PVP/PVDF binder (about 60:35:5 by weight) in N-methyl-2-pyrrolidinone. Using PVP as the binder, a uniform dispersion of Li$_2$S and conductive carbon is obtained as evidenced by optical microscopy (see FIG. 5c), with no huge aggregates observed at the bottom of the slurry (see FIG. 5c inset). On the other hand, large aggregates are visible in the electrode slurry containing PVDF as the binder (see FIG. 5d; the inset shows particle sedimentation at the bottom of the slurry). The good dispersion properties of PVP binder can be attributed to its strong affinity for Li$_2$S, which allows strong adsorption of PVP onto the surface of Li$_2$S particles to stabilize the dispersion, consistent with ab initio simulation results.

Figure 6:
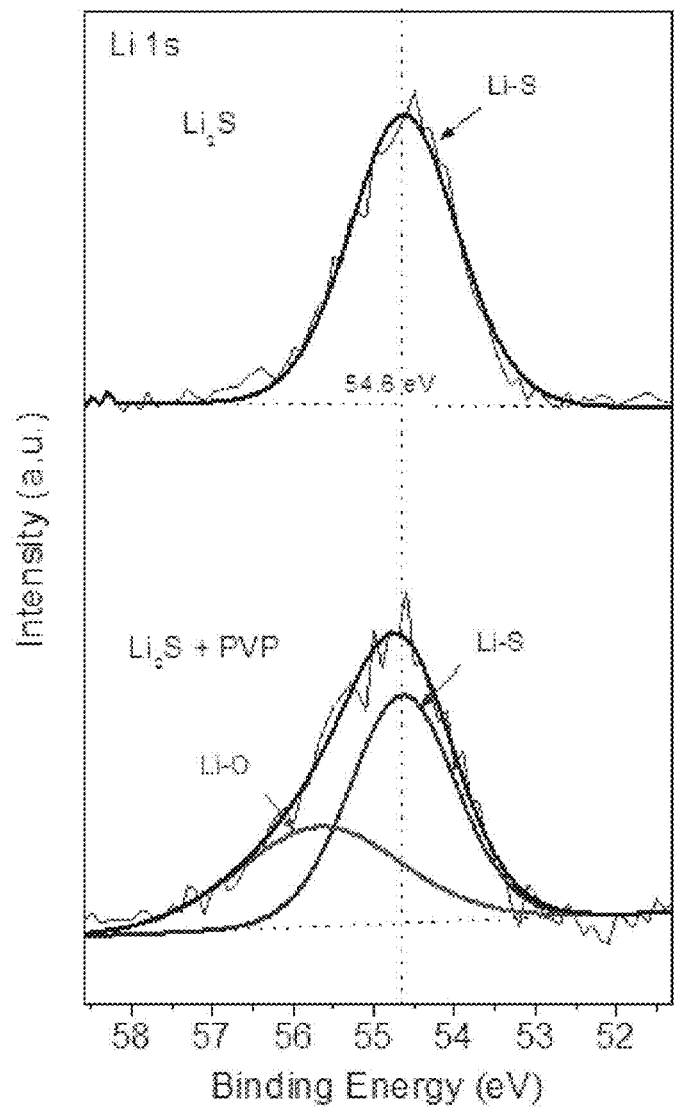
FIG. 6: Spectra from high-resolution X-ray photoelectron spectroscopy of the Li 1 s peak in pure $Li_2S$ (top), and a mixture of $Li_2S$ and PVP (bottom), together with their respective fitted peaks.

This interaction between Li$_2$S and PVP is also evidenced by high-resolution X-ray photoelectron spectroscopy (XPS) measurements. To prevent moisture contamination of Li$_2$S, samples are first tightly-sealed in foil/poly bags in an argon-filled glove box before being transferred into the XPS chamber via an argon-filled glove bag. The as-obtained Li is XPS spectrum of pure Li$_2$S can be fitted with a single peak with a binding energy of about 54.6 eV (see FIG. 6 (top)) corresponding to Li in the Li—S bond. In comparison, a ball-milled mixture of Li$_2$S and PVP shows asymmetric broadening of the Li 1 s spectrum towards higher binding energy (see FIG. 6 (bottom)), indicating a change in chemical environment experienced by Li. A good fit of this spectrum is obtained using 2 peaks at about 54.6 eV and about 55.6 eV, which can be attributed to Li—S and Li—O bonds respectively, in accordance with tabulated values. The appearance of this Li—O peak in the mixture of Li$_2$S and PVP is indicative of Li—O interaction between Li$_2$S and the >C═O group in PVP, which is consistent with the ab initio simulation results described above. The absence of a Li—O peak in the pure Li$_2$S control sample, tested under identical conditions, indicates that this observed peak is not due to moisture contamination (see FIG. 6 (top)).

To evaluate the electrochemical performance of Li$_2$S cathodes using PVP binders, 2032-type coin cells were assembled. An electrode slurry was first prepared by mixing ball-milled Li$_2$S particles with conductive carbon black and PVP binder (about 60:35:5 by weight) in N-methyl-2-pyrrolidinone to obtain a uniform dispersion, followed by drop-casting onto carbon fiber paper to form the working electrode. Carbon fiber paper was used as the current collector (instead of aluminum foil) because it allows a higher mass loading of Li$_2$S (about 2 mg cm$^{-2}$ or more), and also provides a larger surface area for deposition of Li$_2$S during cycling. 2032-type coin cells were then assembled with lithium foil as the counter electrode. The electrolyte used was lithium bis(trifluoromethane sulfonyl)imide in 1:1 v/v 1,2-dimethoxyethane and 1,3-dioxolane, with LiNO$_3$ (about 1 wt %) as an additive to aid passivation of the surface of the lithium anode and reduce the shuttle effect. The Li$_2$S cathodes were first activated at about C/20 (1 C=1,166 mA g$^{-1}$) by charging to a high cutoff voltage of about 3.8 V vs. Li+/Li for substantially complete delithiation, followed by discharge to about 1.8 V. Galvanostatic cycling was then carried out at the specified C-rate from about 1.8 to about 2.6 V vs. Li+/Li. Specific capacity values were calculated based on the mass of Li$_2$S or the corresponding mass of S in the samples.

Figure 7:
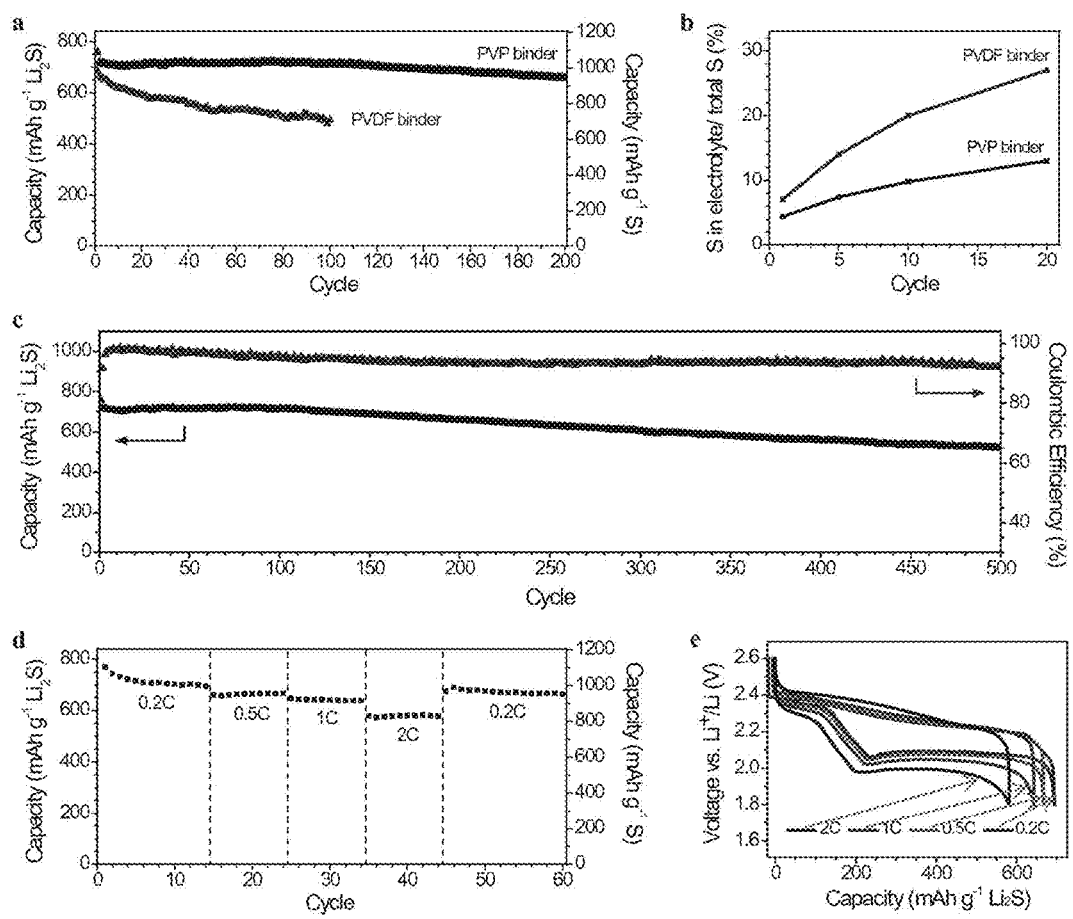
FIG. 7: (a) Specific capacity of $Li_2S$ cathodes using PVP binder cycled over 200 cycles at about 0.2 C, in comparison with PVDF binder. (b) Percentage of sulfur in the electrolyte relative to the total sulfur mass on the electrode after cycling at about 0.2 C using PVP binder in comparison with PVDF binder. (c) Specific capacity and Coulombic efficiency of $Li_2S$ cathodes using PVP binder upon prolonged cycling over 500 cycles at about 0.2 C. (d) Specific capacity and (e) voltage profiles of $Li_2S$ cathodes using PVP binder cycled at various C-rates from about 0.2 C to about 2 C. Specific capacity values were calculated based on the mass of $Li_2S$ or the corresponding mass of S in the samples.

Using PVP as the binder, the Li$_2$S cathodes exhibited stable cycling performance with a high initial capacity of about 760 mAh g$^{-1}$ of Li$_2$S (about 1,090 mAh g$^{-1}$ of S) at about 0.2 C as shown in FIG. 7a. Relative to the initial cycle, the capacity retention achieved at the end of 100 cycles was as high as about 94%. The average Coulombic efficiency over 100 cycles was calculated to be about 97%. Most importantly, even after prolonged cycling over 500 charge/discharge cycles at about 0.2 C, the cells retained about 69% of their initial capacity (see FIG. 7c), which corresponds to a small capacity decay of about 0.062% per cycle. For comparison, cells were also assembled based on conventional PVDF binder, which shows poorer dispersion ability and weaker binding with Li$_2$S and lithium polysulfides (see FIG. 7b, d). Li$_2$S cathodes using PVDF exhibited lower specific capacity and faster capacity decay under identical testing conditions (see FIG. 7a). The capacity retention using PVDF binder was about 72% after 100 cycles (compared to about 94% for PVP binder), indicating a greater degree of polysulfide dissolution into the electrolyte in the former case. This is supported by testing for sulfur content in the electrolyte after discharge using inductively coupled plasma-optical emission spectroscopy (ICP-OES). ICP-OES analysis showed a consistently higher percentage loss of sulfur into the electrolyte at various stages of cycling (1, 5, 10, and 20 cycles) for cells using PVDF compared to PVP as the binder (see FIG. 7b). For instance, in the case of cells using PVDF binder, about 27% of the total sulfur mass on the electrode was found to be dissolved in the electrolyte after 20 cycles, compared to about 13% in the case of PVP binder (see FIG. 7b). This indicates the stronger affinity of PVP binder with lithium polysulfides to reduce their loss into the electrolyte, consistent with ab initio simulation results.

Next, the Li$_2$S cathodes with PVP binders are subjected to cycling at various C-rates to evaluate their electrode kinetics and stability (see FIG. 7d, e). When the C-rate is increased from about 0.2 to about 0.5 to about 1 C, the cells delivered high stabilized capacities of about 695, about 670, and about 645 mAh g$^{-1}$ of Li$_2$S (about 997, about 961, and about 925 mAh g$^{-1}$ of S respectively), as shown in FIG. 7d. The respective capacities achieved at about 0.5 C and about 1 C correspond to about 96% and about 93% of the capacity that was attained at about 0.2 C, indicating fast reaction kinetics in the cathodes. This is supported by the little change in voltage hysteresis between the charge and discharge curves at about 0.2, about 0.5, and about 1 C (see FIG. 7e). Even at a C-rate of about 2 C, a high reversible capacity of about 580 mAh g$^{-1}$ of Li$_2$S (about 832 mAh g$^{-1}$ of S) could still be attained (see FIG. 7d). When the C-rate was switched abruptly from about 2 C to about 0.2 C again, the original capacity was largely recovered (see FIG. 7d), indicating robustness and stability of the cathode material.

Electrochemical Energy Storages Including Li$_2$S Cathodes

The sulfur-containing cathodes described herein can be used for a variety of batteries and other electrochemical energy storage devices. For example, the Li$_2$S cathodes can be substituted in place of, or used in conjunction with, conventional electrodes for lithium-sulfur batteries or other types of batteries.

Figure 8:
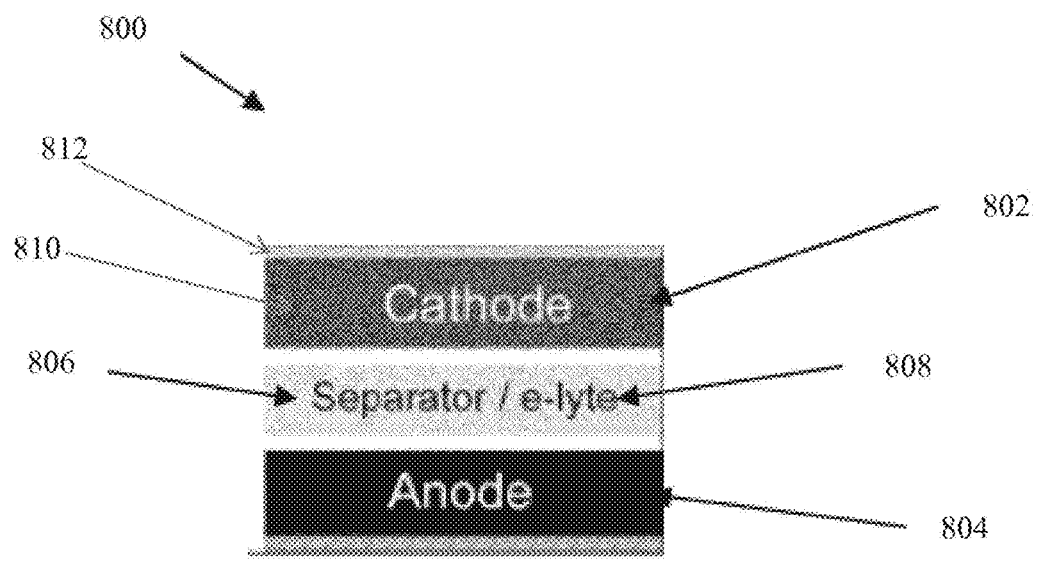
FIG. 8: Schematic of a battery including a cathode formed of $Li_2S$ active material along with a multifunctional binder.

Attention turns to FIG. 8, which shows a schematic of a battery 800 that includes a cathode 802, an anode 804, and a separator 806 that is disposed between the cathode 802 and the anode 804, according to an embodiment of this disclosure. The battery 800 also includes an electrolyte 808, which is disposed between the cathode 802 and the anode 804. In the illustrated embodiment, the cathode 802 is a $Li_2S$ cathode as described herein, and the anode 804 is a lithium metal anode, a graphite anode, a silicon anode, a germanium anode, a tin anode, or another suitable anode. Advantageously, the inclusion of the $Li_2S$ cathode 802 allows pairing with a high-capacity lithium metal-free anode such as graphite, silicon, germanium, or tin, hence obviating dendrite formation and safety concerns associated with metallic lithium.

As shown in FIG. 8, the $Li_2S$ cathode 802 includes a cathode material 810, which includes, or is formed from, a mixture of $Li_2S$ particles, a conductive filler, and a multifunctional binder. An amount of the $Li_2S$ particles in the cathode material 810 can be in the range of about 40 wt % to about 80 wt %, such as from about 45 wt % to about 75 wt %, from about 50 wt % to about 70 wt %, or from about 55 wt % to about 65 wt %. An amount of the conductive filler in the cathode material 810 can be in the range of about 15 wt % to about 55 wt %, such as from about 20 wt % to about 50 wt %, from about 25 wt % to about 45 wt %, or from about 30 wt % to about 40 wt %. An amount of the multifunctional binder in the cathode material 810 can be in the range of about 20 wt % to about 1 wt %, such as from about 15 wt % to about 1 wt %, from about 10 wt % to about 2 wt %, or from about 8 wt % to about 3 wt %.

In some implementations, the $Li_2S$ particles can have sizes in the sub-micron range, namely below 1 nm, to promote uniform dispersion of the $Li_2S$ particles during formation of the $Li_2S$ cathode 802 as well as to enhance surface areas available for electrochemical reactions. Suitable sizes of the $Li_2S$ particles can be attained by milling (e.g., ball-milling) or another suitable size reduction technique. For example, an average size of the $Li_2S$ particles can be in the range of about 5 nm to about 999 nm, such as from about 5 nm to about 200 nm, from about 200 nm to about 400 nm, from about 400 nm to about 600 nm, from about 600 nm to about 800 nm, or from about 800 nm to about 999 nm. As another example, an average size of the $Li_2S$ particles can be in the range of about 5 nm to about 999 nm, such as from about 100 nm to about 900 nm, from about 200 nm to about 800 nm, from about 200 nm to about 700 nm, from about 200 nm to about 600 nm, from about 200 nm to about 500 nm, or from about 200 nm to about 400 nm. In some implementations, a distribution of sizes of the $Li_2S$ particles can be characterized as generally monodisperse, with a standard deviation that is up to about 40%, up to about 35%, up to about 30%, up to about 25%, up to about 20%, up to about 15%, up to about 10%, or up to about 5% of an average size of the $Li_2S$ particles.

Examples of the conductive filler include conductive carbon fillers, such as carbon black, graphite, fullerene, carbon nanoparticles, and carbon nanotubes. Additional examples of the conductive filler include those formed of conductive polymers, metals, and metal alloys.

In the illustrated embodiment, the binder performs multiple functions, including: a) exhibiting a strong affinity with the $Li_2S$ particles to promote uniform dispersion of the $Li_2S$ particles during formation of the cathode material 810 as well as uniform dispersion of the $Li_2S$ particles in the resulting cathode material 810; b) exhibiting a strong affinity with lithium polysulfides to reduce or minimize their loss into the electrolyte 808 during cycling; and c) exhibiting a strong affinity with the conductive filler to promote electronic transport and improve kinetics of cycling.

Figure 9:
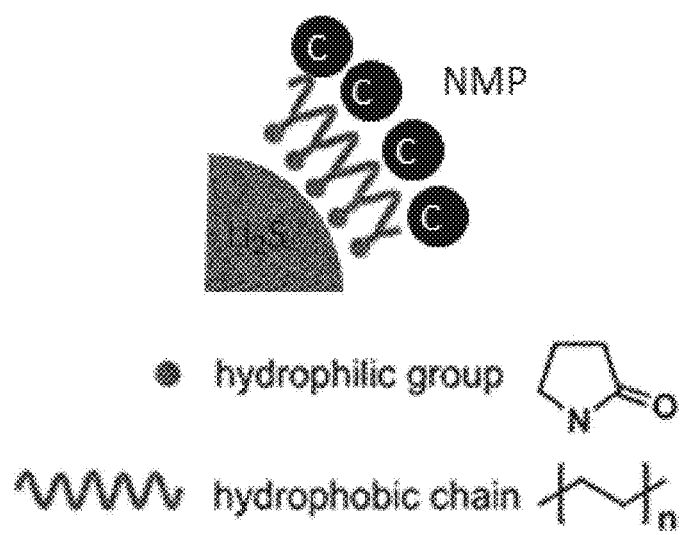
FIG. 9: Schematic showing multiple functions performed by a binder.

FIG. 9 is a schematic showing the multiple functions performed by the binder of an embodiment of this disclosure, for the case of PVP as the binder and carbon black as the conductive filler. As shown in FIG. 9, PVP can be characterized as being amphiphilic, as it includes both hydrophilic (or polar) groups or moieties (corresponding to 2-pyrrolidinone), which exhibit a strong affinity with $Li_2S$ as well as lithium polysulfides that are formed during delithiation, and hydrophobic (or non-polar) groups or moieties (corresponding to a hydrophobic backbone or chain), which exhibit a strong affinity with carbon in the conductive filler.

Examples of suitable polymers for the binder include homopolymers based on vinyl polymers represented as follows:

$$-(CH_2-CHR)_n- \qquad (I)$$

where R is a side group selected from:

1) Acylic and cyclic side groups including the ester (—(C=O)—O—) moiety, such as —(C=O)—O—$R_1$, —O—(C=O)—$R_1$, -L-(C=O)—O—$R_1$, L-O—(C=O)—$R_1$, and cyclic ester groups with 3-, 4-, 5-, 6-, or higher-membered rings, where $R_1$ is selected from, for example, alkyls, alkenyls, alkynyls, and aryls, and L is a linker moiety selected from, for example, alkylenes, alkenylenes, alkynylenes, and arylenes. In some implementations, $R_1$ can include 1 carbon atom or 2 or more carbon atoms, and L, if present, can include 1 carbon atom or 2 or more carbon atoms.

2) Acylic and cyclic side groups including the amide (—(C=O)—$NR_2$—) moiety, such as —(C=O)—$NR_2R_3$, —$NR_2$—(C=O)—$R_3$, -L-(C=O)—$NR_2R_3$, -L-$NR_2$—(C=O)—$R_3$, and cyclic amide groups with 4-, 5-, 6-, or higher-membered rings, where $R_2$ and $R_3$ are independently selected from, for example, hydrogen, alkyls, alkenyls, alkynyls, and aryls, and L is a linker moiety selected from, for example, alkylenes, alkenylenes, alkynylenes, and arylenes. In some implementations, either one of, or both, $R_2$ and $R_3$ are different from hydrogen. In some implementations, $R_2$ can include 1 carbon atom or 2 or more carbon atoms, $R_3$ can include 1 carbon atom or 2 or more carbon atoms, and L, if present, can include 1 carbon atom or 2 or more carbon atoms.

3) Acylic and cyclic side groups including the ketone (—(C=O)—) moiety, such as —(C=O)—$R_4$, -L-(C=O)—$R_4$, and cyclic ketone groups with 3-, 4-, 5-, 6-, or higher-membered rings, where $R_4$ is selected from, for example, alkyls, alkenyls, alkynyls, and aryls, and L is a linker moiety selected from, for example, alkylenes, alkenylenes, alkynylenes, and arylenes. In some implementations, $R_4$ can include 1 carbon atom or 2 or more carbon atoms, and L, if present, can include 1 carbon atom or 2 or more carbon atoms.

4) Acylic and cyclic side groups including the imine (—$CR_5$=N—) moiety, such as —$CR_5$=N—$R_6$, —N=$CR_5R_6$, -L-$CR_5$=N—$R_6$, -L-N=$CR_5R_6$, and cyclic imine groups with 4-, 5-, 6-, or higher-membered rings, where $R_5$ and $R_6$ are independently selected from, for example, hydrogen, alkyls, alkenyls, alkynyls, and aryls, and L is a linker moiety selected from, for example, alkylenes, alkenylenes, alkynylenes, and arylenes. In some implementations, either one of, or both, $R_5$ and $R_6$ are different from hydrogen. In some implementations, $R_5$ can include 1 carbon atom or 2 or more carbon atoms, $R_6$ can include 1 carbon atom or 2 or more carbon atoms, and L, if present, can include 1 carbon atom or 2 or more carbon atoms.

5) Acylic and cyclic side groups including the ether (—O—) moiety, such as —O—$R_7$, -L-O—$R_7$, and cyclic ether groups with 3-, 4-, 5-, 6-, or higher-membered rings, where $R_7$ is selected from, for example, alkyls, alkenyls, alkynyls, and aryls, and L is a linker moiety selected from, for example, alkylenes, alkenylenes, alkynylenes, and arylenes. In some implementations, $R_7$ can include 1 carbon atom or 2 or more carbon atoms, and L, if present, can include 1 carbon atom or 2 or more carbon atoms.

6) Acylic and cyclic side groups including the nitrile (CN) moiety, such as —CN, -L-CN, and cyclic groups with 3-, 4-, 5-, 6-, or higher-membered rings that are substituted with at least one nitrile moiety, where L is a linker moiety selected from, for example, alkylenes, alkenylenes, alkynylenes, and arylenes. In some implementations, L, if present, can include 1 carbon atom or 2 or more carbon atoms.

Additional examples of suitable polymers for the binder include homopolymers based on vinyl polymers represented as follows:

  (II)

  (III)

  (IV)

  (V)

where R, R', R", and R''' are side groups independently selected from groups 1) through 6) listed above with reference to formula (I).

Additional examples of suitable polymers for the binder include copolymers based on vinyl polymers represented as follows:

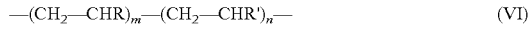  (VI)

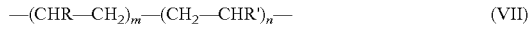  (VII)

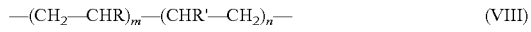  (VIII)

where R and R' are different side groups selected from groups 1) through 6) listed above with reference to formula (I). More generally, a suitable copolymer can be a statistical copolymer, a random copolymer, an alternating copolymer, a periodic copolymer, a block copolymer, a radial copolymer, or a graft copolymer, and can include two or more different monomeric units, where at least one of, or each of, the monomeric units includes one or more side groups selected from groups 1) through 6) listed above with reference to formula (I).

Further examples of suitable polymers for the binder include homopolymers based on polypeptides represented as follows:

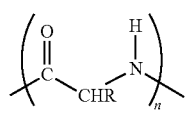  (IX)

where R is a side group selected from hydrogen, alkyls, alkenyls, alkynyls, aryls, and groups 1) through 6) listed above with reference to formula (I). In formula (IX), either of, or both, hydrogen atoms (which are bonded to carbon and nitrogen) can be replaced by a side group R' (and R"), where R, R', and R" are independently selected from alkyls, alkenyls, alkynyls, aryls, and groups 1) through 6) listed above with reference to formula (I).

In some implementations, suitable polymers for the binder include those with a relative high molecular weight, which can lead to a higher viscosity to promote binding to other components of the cathode material 810 as well as binding to a current collector 812. For example, a number average molecular weight of a suitable polymer can be at least about 50,000 g/mol, such as at least about 100,000 g/mol, at least about 200,000 g/mol, at least about 300,000 g/mol, at least about 400,000 g/mol, at least about 500,000 g/mol, at least about 600,000 g/mol, at least about 700,000 g/mol, at least about 800,000 g/mol, at least about 900,000 g/mol, at least about 1,000,000 g/mol, at least about 1,100,000 g/mol, at least about 1,200,000 g/mol, or at least about 1,300,000 g/mol, and up to about 1,500,000 g/mol, up to about 1,800,000 g/mol, or more.

In some implementations, the affinity of the binder towards $Li_2S$ can be characterized by XPS measurements. Specifically, a Li is XPS spectrum of $Li_2S$ can be fitted with a single peak centered at a first binding energy (see, for example, FIG. 6 (top)) corresponding to Li in the Li—S. bond. A mixture of $Li_2S$ and the binder can show asymmetric broadening of the Li is spectrum towards higher binding energy (see, for example, FIG. 6 (bottom)), indicating a change in chemical environment experienced by Li. This broadened spectrum can be fitted using 2 peaks, one centered at or near the first binding energy, and another centered at a second, higher binding energy. In some implementations, the strong affinity of the binder towards $Li_2S$ can be characterized by a shift in the second binding energy relative to the first binding energy of at least about 0.5 eV, such as at least about 0.6 eV, at least about 0.7 eV, at least about 0.8 eV, at least about 0.9 eV, at least about 1 eV, at least about 1.1 eV, or at least about 1.2 eV, and up to about 1.5 eV, up to about 2 eV, or more.

Referring to FIG. 8, the $Li_2S$ cathode 802 also includes the current collector 812, and the cathode material 810 is coated on, disposed on, or otherwise affixed to the current collector 812. In the illustrated embodiment, the current collector 812 includes a fibrous material including, or formed of, carbon, such as in the form of carbon fiber paper or carbon cloth. The porous nature of the fibrous carbon material allows a higher mass loading of $L_2S$, such as by allowing impregnation of the cathode material 810 into voids or interstices of the current collector 812, and also provides a larger surface area for deposition of $Li_2S$ during cycling. A hydrophobic backbone of the binder also exhibits strong affinity with carbon in the current collector 812, thereby promoting binding of the cathode material 810 to the current collector 812 for improved electronic transport and stability.

The battery 800 exhibits a number of performance improvements. For example, the battery 800 can exhibit a maximum discharge capacity at a current rate of 0.2 C (or at 0.5 C, 1 C, 2 C, or another higher or lower reference rate and as evaluated relative to Li/Li+ or another counter/reference electrode) that is at least about 400 mAh $g^{-1}$ of $Li_2S$, such as at least about 500 mAh $g^{-1}$, at least about 600 mAh $g^{-1}$, at least about 700 mAh $g^{-1}$, at least about 720 mAh $g^{-1}$, at least about 740 mAh $g^{-1}$, at least about 760 mAh $g^{-1}$, or at least about 780 mAh $g^{-1}$, and up to about 1,000 mAh $g^{-1}$, or up to about 1,166 mAh $g^{-1}$.

As another example, the battery 800 can exhibit excellent retention of discharge capacity over several cycles, such that, after 100 cycles at a rate of 0.2 C (or at 0.5 C, 1 C, 2 C, or another higher or lower reference rate), at least about 70%, at least about 75%, at least about 80%, at least about 85%, at least about 90%, at least about 92%, or at least about 94%, and up to about 95%, up to about 97%, or more of an initial or maximum discharge capacity is retained. And, after 500 cycles at a rate of 0.2 C (or at 0.5 C, 1 C, 2 C, or another higher or lower reference rate), at least about 50%, at least about 55%, at least about 60%, at least about 65%, at least about 67%, or at least about 69%, and up to about 73%, up to about 75%, or more of an initial or maximum discharge capacity is retained.

Also, in terms of coulombic efficiency (e.g., an initial or a maximum coulombic efficiency or one that is averaged over a certain number of cycles, such as 100 or 500 cycles) at a rate of 0.2 C (or at 0.5 C, 1 C, 2 C, or another higher or lower reference rate), the battery 800 can have an efficiency that is at least about 75%, at least about 80%, at least about 85%, at least about 90%, at least about 95%, or at least about 97%, and up to about 99%, up to about 99.5%, up to about 99.9%, or more.

Moreover, in some embodiments, the effectiveness of containment of lithium polysulfides can be assessed in terms of a weight percentage of sulfur (e.g., whether in elemental or another form) present in the electrolyte 808 after a certain number of cycles, relative to a total weight of sulfur as initially included in the cathode 802. For example, after 20 cycles at a rate of 0.2 C (or at 0.5 C, 1 C, 2 C, or another higher or lower reference rate), no greater than about 25% of sulfur is present in the electrolyte 808, such as no greater than about 20%, no greater than about 17%, no greater than about 15%, or no greater than about 13%.

Example

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Methods:

Ab Initio Simulations.

Ab initio simulations were performed using the Vienna Ab Initio Simulation Package (VASP) in the framework of density functional theory (DFT). The projector augmented-wave (PAW) pseudopotential and the generalized gradient approximation (GGA) exchange-correlation function described by Perdew-Burke-Ernzerhof (PBE) were adopted. To ensure convergence, 500 eV was chosen as the cut-off energy of the plane-wave basis. The vacuum between a polymer and its image exceeds 30 Å, while the distance between the Li—S./Li$_2$S cluster and its image is no less than 15 Å along the periodic direction. These systems were large enough to avoid any artificial interaction caused by periodicity. The binding energy, $E_b$, was specified as the energy difference between the Li—S./Li$_2$S-polymer adsorbed system ($E_{tot}$) and the summation of pure Li—S./Li$_2$S cluster (EusiLas) and pristine polymer ($E_{polymer}$): $E_b=(E_{LiS/Li2S}+E_{polymer})-E_{tot}$. The three-dimensional visualization models were constructed using VESTA 3 software.

Electrochemical Measurements.

Figure 10:
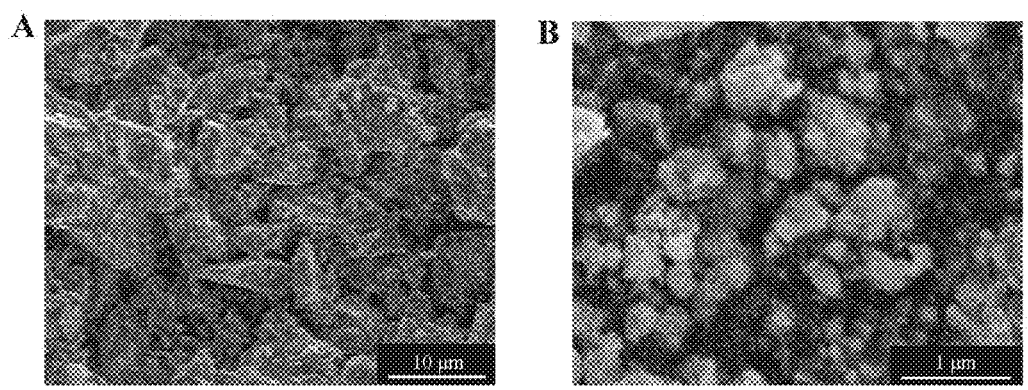
FIG. 10: Scanning Electron Microscope images of (a) commercial and (b) ball-milled $Li_2S$ particles.

Due to the potential sensitivity of Li$_2$S to moisture, electrode preparation and cell assembly procedures were carried out in an argon-filled glove box with moisture and oxygen levels below about 0.5 ppm. Commercial Li$_2$S particles (about 99.9%, Alfa Aesar) were first ball-milled in a tightly-sealed vial for about 4 h using a SPEX 8000D miller to achieve particle sizes in the range of about 200 nm to about 700 nm (see FIG. 10). Conductive carbon black (Super P) and PVP ($M_w$~1,300,000) were dried under vacuum prior to use. The ball-milled Li$_2$S particles were then ground with carbon black and PVP binder in a weight ratio of about 60:35:5 using a mortar and pestle, followed by dispersion in N-methyl-2-pyrrolidinone (NMP) as a solvent to form a slurry. After overnight stirring, the slurry was then drop-cast onto carbon fiber paper (AvCarb P50) and dried at about 60° C. to form the working electrode. 2032-type coin cells were assembled using lithium foil as the counter electrode and Celgard 2250 as the separator. The electrolyte used was a freshly-prepared solution of lithium bis(trifluoromethanesulfonyl)imide (LiTFSI, about 1 M) in 1:1 v/v 1,2-dimethoxyethane (DME) and 1,3-dioxolane (DOL) containing LiNO$_3$ (about 1 wt %). Using a 96-channel battery tester (Arbin Instruments), the Li$_2$S cathodes were first activated at about C/20 (1 C=1,166 mA g$^{-1}$) by charging to a high cutoff voltage of about 3.8 V vs. Li$^+$/Li for substantially complete delithiation followed by discharge to about 1.8 V. Galvanostatic cycling was then carried out at the specified C-rate from about 1.8 to about 2.6 V vs. Li$^+$/Li. The typical mass loading of Li$_2$S was about 2 mg cm$^{-2}$, and specific capacity values were calculated based on the mass of Li$_2$S or the corresponding mass of S in the samples.

Electrolyte Testing.

For analysis of sulfur content in the electrolyte after cycling, a sulfur-free lithium salt of LiClO$_4$ (about 1 M) in 1:1 v/v DME/DOL solution with LiNO$_3$ (about 1 wt %) was used as the electrolyte. After 1, 5, 10, and 20 cycles at about 0.2 C, the cells were discharged to about 1.8 V vs. Li$^+$/Li, and the voltage was maintained for over 20 h, following which they were disassembled and the contents (cathode, anode and electrolyte-soaked separator) were washed with DOL solution. This polysulfide-containing solution was then oxidized with concentrated HNO$_3$ and diluted with deionized water for analysis of sulfur content using ICP-OES (Thermo Scientific ICAP 6300 Duo View Spectrometer).

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A manufacturing method of a battery electrode, comprising:
   mixing Li$_2$S particles with a binder to form a slurry; and
   disposing the slurry on a current collector, wherein the binder includes a polymer represented as follows:

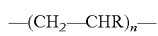

where n is greater than 1, R is a side group selected from —(C=O)—O—$R_1$, -L-(C=O)—O—$R_1$, and -L-O—(C=O)—$R_1$, where $R_1$ is an alkyl including 1 carbon atom or 2 carbon atoms, and L is an alkylene including 1 carbon atom or 2 carbon atoms.

2. A manufacturing method of a battery electrode, comprising:
mixing $Li_2S$ particles with a binder to form a slurry; and
disposing the slurry on a current collector, wherein the binder includes a polymer represented as follows:

—$(CH_2$—$CHR)_n$— where n is greater than 1, R is an acyclic side group selected from —$NR_2$—(C=O)—$R_3$, -L-(C=O)—$NR_2R_3$, and -L-$NR_2$—(C=O)—$R_3$, where $R_2$ and $R_3$ are independently selected from hydrogen and alkyls including 1 carbon atom or 2 carbon atoms, and L is an alkylene including 1 carbon atom or 2 carbon atoms.

3. A manufacturing method of a battery electrode, comprising:
mixing $Li_2S$ particles with a binder to form a slurry; and
disposing the slurry on a current collector, wherein the binder includes a polymer represented as follows:

—$(CH_2$—$CHR)_n$— where n is greater than 1, R is a side group selected from —(C=O)—$R_4$ and -L- (C=O)—$R_4$, where $R_4$ is an alkyl including 1 carbon atom or 2 carbon atoms, and L is an alkylene including 1 carbon atom or 2 carbon atoms.

4. The manufacturing method of any one of claims 1-3, wherein the $Li_2S$ particles have sizes in the sub-micron range.

5. The manufacturing method of any one of claims 1-3, wherein the polymer has a number average molecular weight of at least 500,000 g/mol.

6. A battery electrode comprising:
a current collector; and
a cathode material coated on the current collector, the cathode material including a sulfur-containing active material dispersed with a binder, the binder including a polymer including an acyclic side group selected from:
(1) —(C=O)—O—$R_1$, where $R_1$ is selected from alkyls including 2 to 10,
(2) —O—(C=O)—$R_1$, where $R_1$ is selected from alkyls including 2 to 10 carbon atoms,
(3) -L-(C=O)—O—$R_1$, where $R_1$ is selected from alkyls including 1 to 10 carbon atoms, and L is a linker moiety selected from alkylenes including 1 to 10 carbon atoms,
(4) -L-O—(C=O)—$R_1$, where $R_1$ is selected from alkyls including 1 to 10 carbon atoms, and L is a linker moiety selected from alkylenes including 1 to 10 carbon atoms,
(5) —$NR_2$—(C=O)—$R_3$, where $R_2$ and $R_3$ are independently selected from hydrogen and alkyls including 1 to 10 carbon atoms,
(6) -L-(C=O)—$NR_2R_3$, where $R_2$ and $R_3$ are independently selected from hydrogen and alkyls including 1 to 10 carbon atoms, and L is a linker moiety selected from alkylenes including 1 to 10 carbon atoms,
(7) -L-$NR_2$—(C=O)—$R_3$, where $R_2$ and $R_3$ are independently selected from hydrogen and alkyls including 1 to 10 carbon atoms, and L is a linker moiety selected from alkylenes including 1 to 10 carbon atoms,
(8) —(C=O)—$R_4$, where $R_4$ is selected from alkyls including 1 to 10 carbon atoms, and
(9) -L-(C=O)—$R_4$, where $R_4$ is selected from alkyls including 1 to 10 carbon atoms, and L is a linker moiety selected from alkylenes including 1 to 10 carbon atoms.

* * * * *